Jan. 31, 1961 R. G. W. BROWN ET AL 2,970,019
TEMPERATURE COMPENSATED JOURNAL BEARING
Filed Sept. 3, 1958
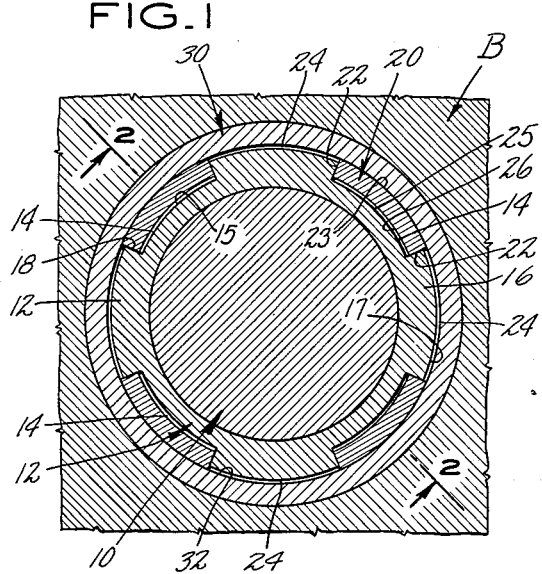
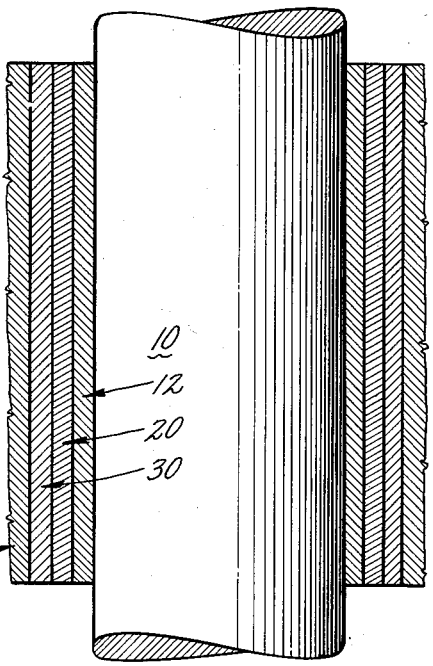
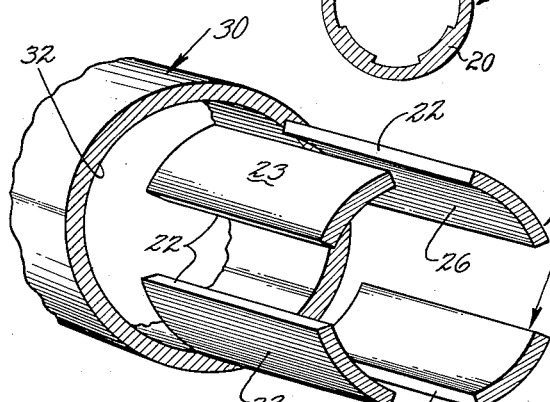
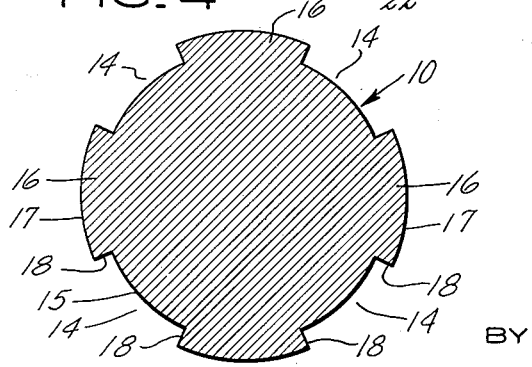
INVENTORS
ROBERT G. W. BROWN
LEE P. FARNSWORTH
GEORGE P. FULTON
PHILIP L. GAGNER
JACK M. TARBOX
BY M. B. Tasher
ATTORNEY

United States Patent Office 2,970,019
Patented Jan. 31, 1961

---

2,970,019

TEMPERATURE COMPENSATED JOURNAL BEARING

Robert G. W. Brown, Rockville, Conn., Lee P. Farnsworth, Lancaster, Mass., George P. Fulton, Bel Air, Md., Philip L. Gagner, Wilmington, Mass., and Jack M. Tarbox, Springvale, Maine, assignors to United Aircraft Corporation, East Hartford, Conn., a corporation of Delaware Filed Sept. 3, 1958, Ser. No. 758,737

14 Claims. (Cl. 308—237)

This invention relates to improved means and a method for mounting a sleeve having one coefficient of expansion on a shaft having a different coefficient of expansion, and it is one of the objects of this invention to provide such a sleeve mounting which will keep the shaft and the sleeve coaxial throughout a wide range of temperature variation.

The invention is particularly applicable, although not limited, to bearing journals, in which a journal sleeve chosen for its good bearing properties is mounted on a shaft having good shaft properties. Good bearing materials and good shaft materials frequently have widely different rates of thermal expansion. The shaft material, which must have good tensile strength, has a high coefficient of expansion, while the bearing material which has little tensile strength has a relatively low coefficient of expansion. Further, the most desirable bearing materials for high temperature applications are so brittle that only the simplest machining operations can be performed thereon.

In order for a journal assembly of this description to operate over a wide range of temperatures, it is necessary to find some way to permit the shaft material to expand at a faster rate than the journal material while at all temperatures insuring adequate support for the journal to maintain the coaxial relationship between the shaft and the journal sleeve.

Under these conditions if the temperature range is, for example, 100° F. to 1700° F., and the journal sleeve is a good fit on the shaft at the upper temperature range, then the journal sleeve will be loose on the shaft at lower temperatures and the coaxial relationship will not be maintained. If on the other hand, the journal sleeve is a good fit on the shaft at the lower temperature of the range, the sleeve will either be ruptured or stretched as the temperature increases, and if it is not destroyed, it will thereafter be loose on the shaft at the lower temperatures of the range.

It is an object of this invention to provide a shaft and journal sleeve assembly which will maintain adequate support for the sleeve on the shaft throughout very wide temperature variations.

Another object of this invention is to provide a construction for this sort of shaft and sleeve assembly in which brittle, difficult-to-machine bearing materials can be employed.

A further object of this invention is the provision of a method for producing the shaft and journal assembly of the present invention.

A still further object of the invention is generally to improve the construction and performance of shaft and journal assemblies.

These and other objects and advantages will be pointed out in connection with the following detailed description of one specific embodiment of the invention shown in the accompanying drawing.

In this drawing, Fig. 1 is a cross-sectional view taken through a shaft and journal assembly in accordance with this invention, the parts being shown at the lower temperature of the range, or at approxiamtely room temperature;

Fig. 2 is a longitudinal sectional view taken through the journal assembly on line 2—2 of Fig. 1, the parts being shown in the position they occupy at 1700° F.;

Fig. 3 is an exploded perspective view of the several parts of the assembly;

Fig. 4 shows a modified shaft construction; and

Fig. 5 shows a modified journal sleeve construction.

As shown in Fig. 1, the journal assembly chosen to illustrate the invention includes a shaft 10 of steel or other good shaft material having a high tensile strength. A sleeve 12 of like material has a pressed fit on shaft 10. Sleeve 12 has axial slots, or grooves, 14 cut in its outside surface at spaced intervals about its periphery somewhat in the manner that slots are cut in a splined shaft construction. These slots and the intermediate splines 16 differ from the ordinary spline construction in that the bottoms 15 of the slots and the tops 17 of the splines are circular arcs and the sides 18 of the slots are radial. Thus, these slots 14 are segmental in cross section.

Each slot 14 has an arcuate segmental key block 20 therein of such dimensions that at the low temperature of the range its opposite radial ends 22 abut the radial surfaces 18 of the slots when the key block has a little less than completely entered the slot 14. In this position, the outer arcuate end surface 23 of the key block protrudes slightly beyond the outer circumference 17 of sleeve 12 and this leaves a radial space 25 between the arcuate bottom 15 of groove 14 and the inner arcuate surface 26 of the key block.

With the key blocks in the slots 14, an outer journal sleeve 30 is fitted with a shrink or forced fit onto the projecting arcuate end surfaces of the key blocks. This is done when the latter and the shaft and sleeve assembly 10, 12 are at room temperature. This results in forcing the ends 22 of the key blocks against the radial surfaces 18. It will also be noted that a space 24 is provided between the outer arcuate surface 17 of the splines and the inner arcuate surface 32 of the outer sleeve 30. This entire unit is journaled in a bearing B.

Key blocks 20 are made of the same material as journal sleeve 30 and, but for the difficulty of making the axial dovetail slots, the outer journal sleeve and the key blocks could be integral. Also, the shaft and and sleeve assembly comprising shaft 10 and sleeve 12 could be made integral (Fig. 4) except for the additional cost of making the assembly including the cost of turning the shaft down from the larger sleeve diameter. The difficulty of making the key blocks 20 and sleeve 30 integral is particularly acute if certain good high temperature bearing materials are used, such as one of the cermets, which are too brittle to have anything but the simplest machining performed thereon.

It will be understood that the shaft 10 and the inner sleeve 12 are made of good shaft material having high tensile strength and consequently having a high coefficient of expansion, while the key blocks 20 and outer sleeve 30 are made of a material having good bearing properties which inherently has a much lower coefficient of expansion.

In assembling the journal sleeve 30 on the shaft assembly, the key blocks 20 are first placed in the slots 14 of the shaft assembly when the parts are at room temperature. The journal sleeve 30 is then either pressed on over the outer surfaces 23 of the key blocks, or preferably, heated to an elevated temperature and shrunk onto the key blocks. In either event, the key blocks are wedged in the grooves 14 with their radial ends 22 forced against radial surfaces 18 of the grooves. There is a clearance space 24 between the inner surface 32 of sleeve 30 and the top surfaces 17 of the dovetails or splines 16 to allow for the increased radial expansion of the shaft unit comprising shaft 10 and sleeve 12 as the temperature increases. At the higher temperatures the key blocks 20 are still forced against the inside surface 32 of sleeve 30, but the clearance space 24 between the end surfaces 17 of splines 16 and the inner surface 32 of sleeve 30 diminishes until at the top of the temperature range (here 1700° F.) line-to-line contact exists, as shown in Fig. 2.

The radial sides 18 of the slots 14 and the radial ends 22 of key blocks 20 remain constantly in contact during increase in temperature. The key blocks will never be crushed between the radial surfaces 18 on adjacent splines 16 because all expansion in this case takes place along radial lines. Instead, the key blocks will reposition themselves in the slots 14 upon temperature increase, their radial ends 22 sliding inwardly over the like radial surfaces 18 as the shaft assembly 10, 12 expands and the slots 14 enlarge until at design temperature (1700° F.) the spaces 24 and 25 are used up and confronting surfaces 15, 26 and 17, 32 abut.

It is important to note that at the low end of the temperature range there is initially a tight fit between journal sleeve 30 and the key blocks 20 and also between these blocks 20 and the splines 16 of intermediate sleeve 12. This is due to the initial shrink fit of sleeve 30 over the blocks, resulting in forcing the latter into grooves 14 with their radial side walls 22 wedged firmly against the radial walls 18 of grooves 14. As the temperature increases there is a change in circumferential dimensions. Key blocks 20 and journal sleeve 20 expand less rapidly than shaft 10 and sleeve 12, and hence the key blocks are forced by the resistance to expansion of sleeve 30 to move inwardly into grooves 14. This is possible because the slots 14 enlarge. Line contact is maintained between ends 22 and 18 because the angle subtended by the segments formed by the splines 16 and key blocks 20 remains unchanged over any temperature range although the physical size of these parts will increase at different rates since all expansion must follow radial lines. As a result, the journal sleeve 30 and shaft 10 remain concentric throughout the entire temperature range and the sleeve is rigidly supported relative to the shaft at all times.

In this connection it should be noted that because the growth due to expansion takes place along radial lines 18 and 22, it is possible to select metals for the bearing which are desirable with total disregard for their coefficients of expansion. Thus, the journal sleeve 30 can be one of the cermets which are good bearing material at very high temperatures and have a low coefficient of expansion, while the shaft 10 and sleeve 12 may be of high tensile strength material such as steel capable of carrying high loads and having a much higher coefficient of expansion. Thus, in designing our improved bearing for a given temperature range, which is limited only by the temperature the metals can withstand in operation, the coefficient of expansion of the different metals need be considered only in determining the radial clearances provided at 24 and 25.

While only one embodiment of the invention has been disclosed for purposes of illustration, it will be evident that the invention is not limited to journal bearings but is equally well applicable to any construction where a sleeve is fitted over a shaft and it is desired to maintain them coaxial over a wide temperature range.

We claim:

1. In combination, a shaft assembly having one coefficient of expansion, a sleeve surrounding said assembly having a different coefficient of expansion, and rigid connection means between said assembly and said sleeve for maintaining said sleeve coaxial with said assembly over a wide range of temperature variation including longitudinal interfitting splines on said assembly and sleeve having mutually engaging radial faces which remain in contact throughout said range.

2. In combination, a shaft having one coefficient of expansion, a sleeve mounted on said shaft and coaxial therewith having a different coefficient of expansion, and rigid means interconnecting said shaft and sleeve for maintaining the two coaxial over a temperature range of 1700° F. including a plurality of longitudinal mutually engaging radial faces on said shaft and sleeve.

3. In combination, a shaft unit having a high coefficient of expansion, and a sleeve unit surrounding said shaft unit having a lower coefficient of expansion, said units having therebetween rigid interconnecting means for maintaining them in coaxial relationship over a wide range of temperature variation including interlocking axial splines and axial slots on said units having abutting radial side walls extending axially along said units.

4. A journal assembly comprising a shaft, a sleeve on said shaft having a plurality of axial grooves spaced at intervals about its circumference, the side walls of said grooves lying on radii of said shaft, said shaft and said sleeve having a high coefficient of expansion, arcuate key blocks in said grooves having radial side walls which seat on the side walls of said grooves, the width of said key blocks being slightly greater than the width of said grooves so that the ends of said key blocks project slightly beyond the circumference of said sleeve, and a journal sleeve having a low coefficient of expansion surrounding and seated on the outer arcuate ends of said key blocks.

5. A journal assembly comprising a shaft, a sleeve on said shaft having a plurality of axial grooves spaced at intervals about its circumference, the side walls of said grooves lying on radii of said shaft, said shaft and said sleeve having a high coefficient of expansion, a journal sleeve having a low coefficient of expansion surrounding said grooved sleeve, and means for rigidly supporting said journal sleeve in concentric relation on said grooved sleeve over a wide range of temperature variation including arcuate key blocks seated in the grooves in said grooved sleeve, said key blocks having radial side walls which seat on the radial side walls of said grooves, the key block segment being slightly larger than the groove segment so that at the low end of the temperature range the key blocks project slightly beyond the circumference of said grooved sleeve and are in pressure engagement with the inner surface of said journal sleeve.

6. In combination, a shaft unit having a high coefficient of expansion, said shaft unit having axial grooves cut therein at spaced points about its periphery, said grooves having side walls which lie on radii of said shaft unit, key blocks in said grooves having radial side walls which abut the radial side walls of said grooves, said key blocks having arcuate outer ends which project slightly above the circumferential surface of said shaft unit when said key blocks are seated in said grooves, and a journal sleeve surrounding said key blocks having a force fit with the outer surfaces of said key blocks and having a circumference greater than the circumferential surface of said shaft unit.

7. In a shaft and sleeve assembly, a shaft having axial grooves at spaced points about its circumference, said grooves having radial sides, a key block in each groove having radial sides abutting the radial sides of its respective groove, said blocks having their inner surfaces spaced from the bottoms of said grooves, said blocks having outer arcuate surfaces projecting above the periphery of said shaft, and a sleeve surrounding said shaft and forcibly engaging the outer surfaces of said blocks.

8. In a shaft and sleeve assembly, a shaft having axial grooves at spaced points about its circumference, said grooves having radial sides, a key block in each grooves having radial sides abutting the radial sides of its respective groove, said blocks having their inner surfaces parallel with and spaced from the bottoms of said grooves, said blocks having arcuate surfaces projecting above the periphery of said shaft a distance equal to the space beneath said blocks, and a sleeve on the projecting surfaces of said blocks having an interference fit with said blocks.

9. In a shaft and sleeve assembly, a shaft having axial grooves at spaced points about its circumference, said grooves having arcuate bottoms and radial sides, key blocks in said grooves having radial sides abutting the radial sides of their respective grooves and having arcuate bottoms parallel with and spaced from the bottoms of said grooves, said blocks having arcuate surfaces projecting above the periphery of said shaft a distance equal to the space beneath said blocks, and a sleeve of bearing material on the projecting surfaces of said blocks having an interference fit with said blocks.

10. In a shaft and journal sleeve assembly, a shaft of high tensile strength having axial grooves at spaced points about its circumference, said shaft having a high coefficient of expansion, said grooves having arcuate bottoms and radial sides, key blocks in said grooves having radial sides abutting the radial sides of the respective grooves and having arcuate bottoms parallel with and spaced from the bottoms of said grooves, said blocks having arcuate surfaces projecting above the periphery of said shaft a distance equal to the space beneath said blocks, a journal sleeve of good bearing material having an interference fit on the projecting surfaces of said blocks, said blocks and said sleeve having low tensile strength and having a relatively low coefficient of expansion, said journal sleeve having an interference fit on said blocks at the low temperature end of the temperature range over which the assembly operates.

11. A shaft and journal sleeve assembly capable of retaining concentricity of shaft and sleeve over a range of 1700° F. in which the shaft and sleeve have widely different coefficients of expansion, comprising a shaft having axial grooves at spaced intervals about its periphery, said grooves having arcuate bottoms and radial sides, arcuate key blocks in said grooves having radial sides abutting the sides of said grooves and having arcuate bottoms parallel with and spaced from the bottoms of said grooves, said key blocks having a width such that at the lower end of the temperature range their arcuate tops project above the periphery of said shaft an amount equal to the width of said bottom spaces, and a journal sleeve having an interference fit on the top of said blocks at the low end of said temperature range.

12. In a bearing journal, a shaft having a plurality of spline-like lobes, and a journal having intermeshing lobes, the lobes on said shaft and said journal each having radial faces struck about the axis of said shaft and connecting arcuate faces, the adjacent radial faces on the lobes of said shaft and said journal being in intimate contact during expansion and contraction of said bearing journal, and the confronting arcuate faces of said shaft and said journal being spaced apart when the bearing is cold to provide room for expansion of the journal parts.

13. In combination, a shaft having a high coefficient of expansion, and a journal keyed to said shaft having a low coefficient of expansion, said shaft having a plurality of spline-like lobes having radial sides struck about the center of said shaft, the ends of said lobes being arcuate, and said journal having a plurality of mating lobes on its inner surface, the radial faces of the lobes on said shaft and journal being in intimate contact at all temperatures and the arcuate ends of said lobes on said shaft and journal being spaced from the corresponding arcuate faces on said journal and shaft when the parts are cold.

14. Two coaxial inner and outer members having widely different coefficients of expansion and having means for rigidly supporting each other in accurate concentricity over a wide range of temperature variation comprising inner and outer overlapping projections at spaced points about the peripheries of said outer and inner members respectively, said projections where they overlap having mutually engaging radial faces and said members having a gap therebetween at all confronting surfaces between said radial faces throughout said temperature range.

References Cited in the file of this patent

UNITED STATES PATENTS

| 523,238 | Rarig | July 17, 1894 |
| 1,438,054 | Parsons | Dec. 5, 1922 |
| 1,693,838 | Faudi | Dec. 4, 1928 |
| 2,582,889 | Sedgwick | Jan. 15, 1952 |
| 2,590,761 | Edgar | Mar. 25, 1952 |